US012704725B2

(12) United States Patent
Holland et al.

(10) Patent No.: US 12,704,725 B2
(45) Date of Patent: Aug. 11, 2026

(54) ACTIVE CONTROL OF VIRTUAL IMAGE DEPTH POSITIONING

(71) Applicant: Google LLC, Mountain View, CA (US)

(72) Inventors: Lloyd Frederick Holland, Waterloo (CA); Matthew Thomas Valente, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 359 days.

(21) Appl. No.: 18/493,430

(22) Filed: Oct. 24, 2023

(65) Prior Publication Data

US 2025/0130426 A1 Apr. 24, 2025

(51) Int. Cl.

| | |
|---|---|
| ***G02B 27/01*** | (2006.01) |
| ***G02C 7/08*** | (2006.01) |
| ***G06F 3/01*** | (2006.01) |
| ***G06V 20/00*** | (2022.01) |
| ***G06V 20/50*** | (2022.01) |

(52) U.S. Cl.

CPC ......... *G02B 27/0172* (2013.01); *G02C 7/083* (2013.01); *G06F 3/011* (2013.01); *G06V 20/35* (2022.01); *G06V 20/50* (2022.01); *G02B 2027/0127* (2013.01); *G02B 2027/0138* (2013.01); *G02B 2027/0178* (2013.01)

(58) Field of Classification Search

CPC ........ G02B 27/0172; G02B 2027/0127; G02B 2027/0138; G02B 2027/0178; G02B 2027/0185; G02C 7/083; G06F 3/011; G06V 20/35; G06V 20/50

See application file for complete search history.

(56) References Cited

U.S. PATENT DOCUMENTS

| | | | | |
|---|---|---|---|---|
| 6,947,219 | B1 | 9/2005 | Ou | |
| 2018/0275394 | A1* | 9/2018 | Yeoh | G02B 27/0172 |
| 2021/0149197 | A1* | 5/2021 | Yadin | G02B 26/06 |
| 2021/0311332 | A1* | 10/2021 | Lee | G02C 7/083 |
| 2022/0113552 | A1 | 4/2022 | Schowengerdt | |
| 2023/0069895 | A1 | 3/2023 | Held et al. | |

OTHER PUBLICATIONS

Zhang, “Design of Head Mounted Displays”, Tutorial report for Optics 521, retrieved from https://wp.optics.arizona.edu/optomech/wp-content/uploads/sites/53/2016/10/Design-of-head-mounteddisplays-Zhang.pdf, Dec. 12, 2007, 6 pages.

* cited by examiner

*Primary Examiner* — Collin X Beatty

(74) *Attorney, Agent, or Firm* — Brake Hughes Bellermann LLP

(57) ABSTRACT

A head-mounted display device includes a controller configured to activate a display of a head-mounted display device. The head-mounted display device includes an eye-side lens and a world-side lens. The controller may activate the eye-side lens and the world-side lens to display virtual content at a first virtual depth. The controller may deactivate the eye-side lens and the world-side lens to display the virtual content at a second virtual depth, where the second virtual depth is greater than the first virtual depth.

17 Claims, 5 Drawing Sheets

Virtual Content
112
Waveguide
108
120a

Virtual Content
112
Waveguide
108
120b

ACTIVE CONTROL OF VIRTUAL IMAGE DEPTH POSITIONING

BACKGROUND

Some conventional augmented reality (AR) devices may use push pull lenses with a static ophthalmic power to position a virtual display at a static distance (e.g., a fixed distance) in space from the user.

SUMMARY

In some aspects, the techniques described herein relate to a method including: activating a display of a head-mounted display device, the head-mounted display device including an eye-side lens and a world-side lens; activating the eye-side lens and the world-side lens to display virtual content at a first virtual depth; and deactivating the eye-side lens and the world-side lens to display the virtual content at a second virtual depth, the second virtual depth being greater than the first virtual depth.

In some aspects, the techniques described herein relate to a head-mounted display device including: at least one processor; and a non-transitory computer-readable medium storing executable instructions that cause the at least one processor to execute: activate a display of a head-mounted display device, the head-mounted display device including an eye-side lens and a world-side lens; activate the eye-side lens and the world-side lens to display virtual content at a first virtual depth; and deactivate the eye-side lens and the world-side lens to display the virtual content at a second virtual depth, the second virtual depth being greater than the first virtual depth.

In some aspects, the techniques described herein relate to a non-transitory computer-readable medium storing executable instructions that when executed by at least one processor cause the at least one processor to execute operations, the operations including: activating a display of a head-mounted display device, the head-mounted display device including an eye-side lens and a world-side lens; activating the eye-side lens and the world-side lens to display virtual content at a first virtual depth; and deactivating the eye-side lens and the world-side lens to display the virtual content at a second virtual depth, the second virtual depth being greater than the first virtual depth.

The details of one or more implementations are set forth in the accompanying drawings and the description below. Other features will be apparent from the description and drawings, and from the claims.

DETAILED DESCRIPTION

This disclosure relates to a head-mounted display device (e.g., smartglasses) that selectively activates or deactivates an eye-side lens and a world-side lens to adjust a virtual depth of virtual content displayed on the head-mounted display device. The eye-side lens and the world-side lens include adaptive lens elements. Adaptive lenses are a type of lens that can change its shape in response to a stimulus (e.g., an applied voltage) to provide a targeted optical power (e.g., measured in diopters). In some examples, the eye-side lens and the world-side lens have the same but opposite diopter values (e.g., the eye-side lens being-0.5D, the world-side lens being +0.5). The head-mounted display device may selectively activate the world-side lens and the eye-side lens to change the virtual content's depth while keeping the real world in focus. The user may select a control on the head-mounted display device to switch the depth of the virtual content or the depth may be automatically switched via sensors on the device (e.g., ambient light sensor, global positioning system (GPS), world facing cameras, etc.) based on a detected environment (e.g., when outside, show the virtual image at a far distance).

The head-mounted display device includes a lens controller configured to activate both the eye-side lens and the world-side lens. Activation of the eye-side lens and the world-side lens causes virtual content to be displayed at a first virtual depth. The lens controller may deactivate the eye-side lens and the world-side lens, which may cause the virtual content to be displayed at a second virtual depth. The first virtual depth is less than the second virtual depth. In some examples, the first virtual depth is relatively close to the user. In some examples, the first virtual depth is the focal distance of the display. In some examples, the second virtual depth is relatively far from the user.

Figure 1A:
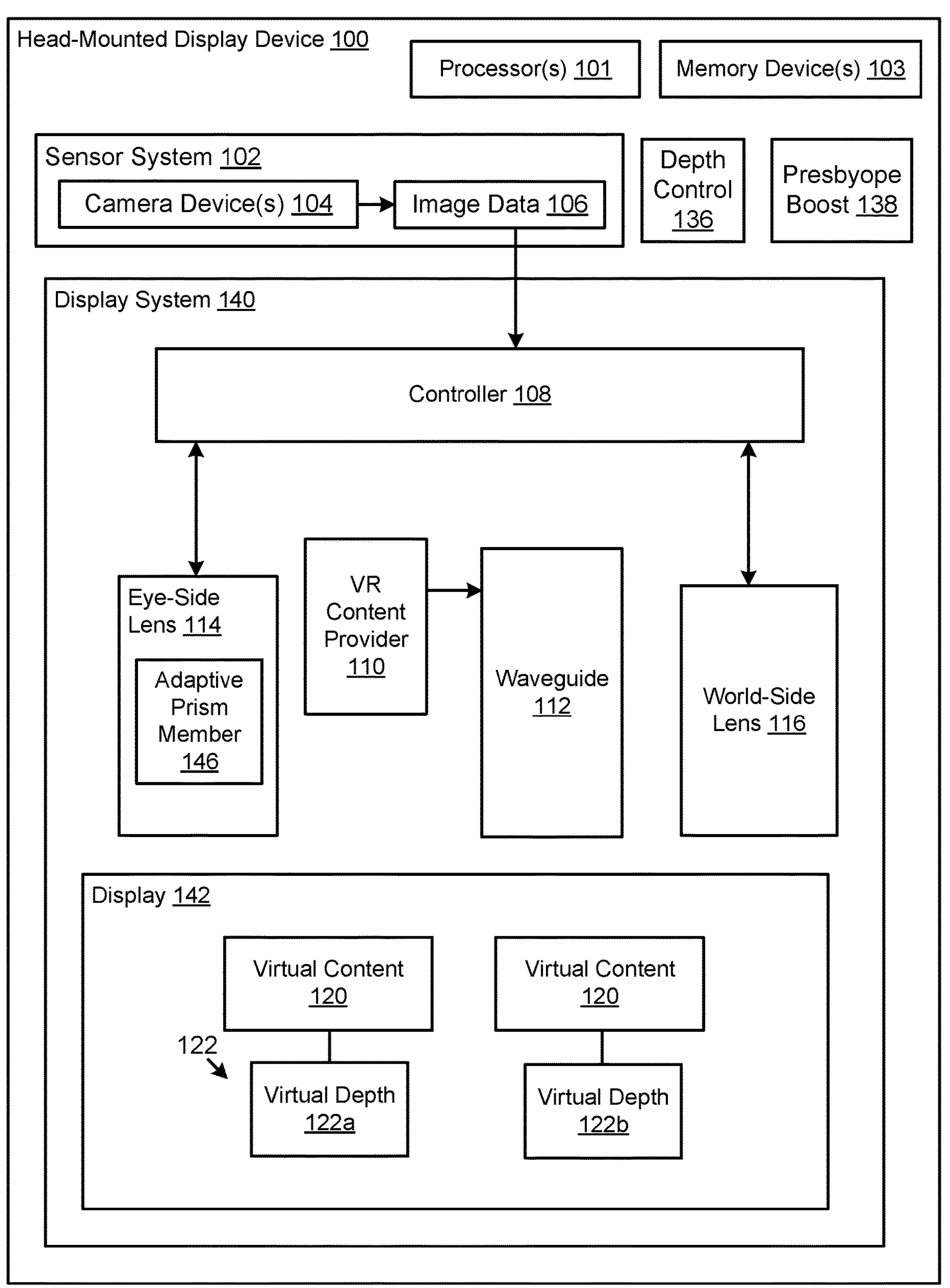
FIG. 1A illustrates a head-mounted display device configured to adjust a virtual depth of virtual content by activating or deactivating a world-side lens and an eye-side lens according to an aspect.
Figures 1B, 1C:
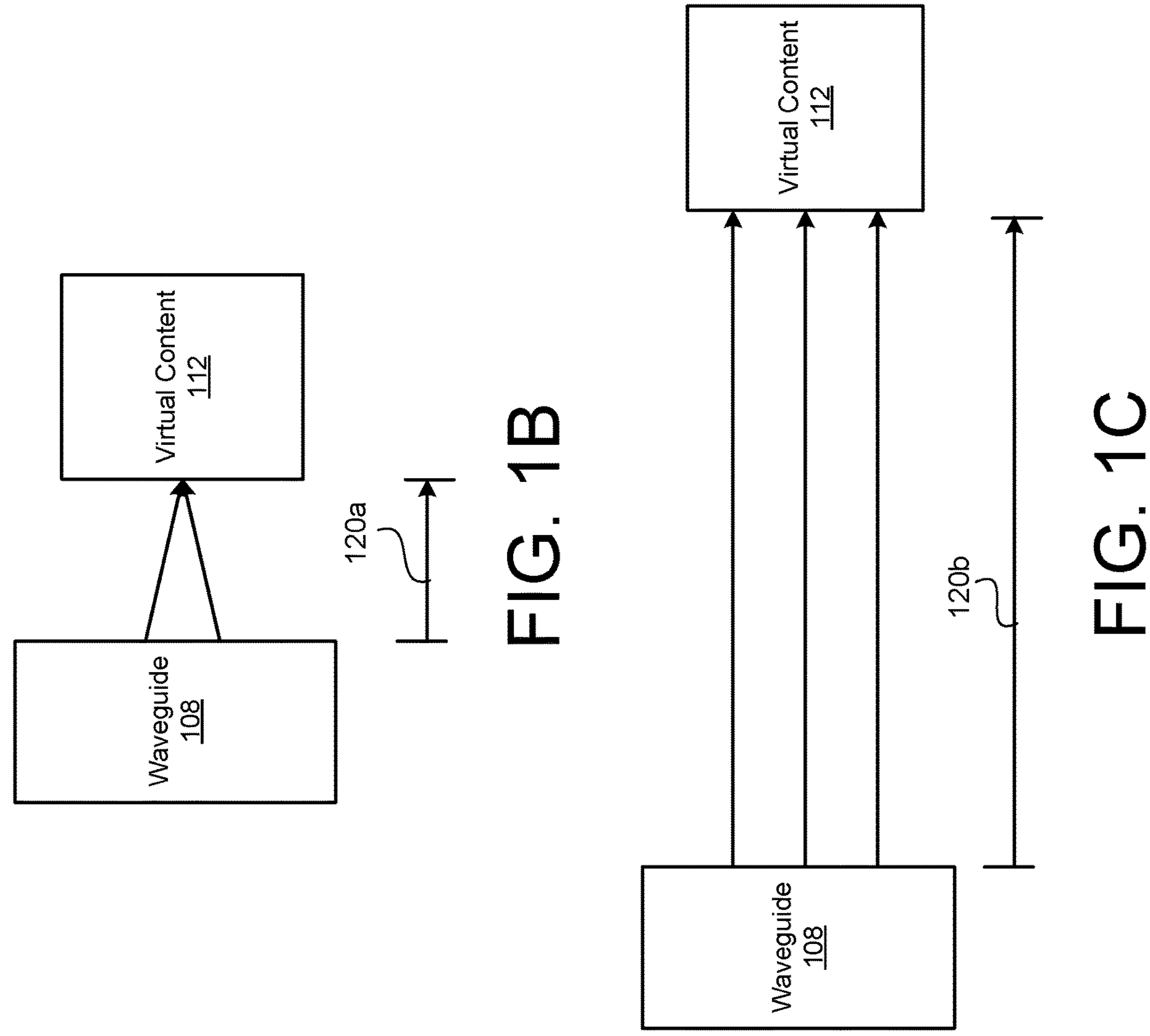
FIG. 1B illustrates an example of virtual content positioned at a first virtual depth according to an aspect.
FIG. 1C illustrates an example of virtual content positioned at a second virtual depth according to an aspect.

FIGS. 1A through 1C illustrate a head-mounted display device 100 configured to adjust a virtual depth 122 of virtual content 120 by activating or deactivating an eye-side lens 114 and a world-side lens 116. In some examples, the virtual depth 122 is a distance from the pupil plane of the user's eye to the virtual content 120. The virtual depth 122 may be the distance on how far away (or close) the virtual content 120 is from the user. In some examples, the virtual depth 122 may be referred to as a virtual image depth or a virtual image plane depth. The head-mounted display device 100 may include an argument reality (AR) device. The head-mounted display device 100 includes a display system 140 configured to present an augmented reality environment on a display 142. In some examples, the display 142 includes a near-eye display that uses liquid crystal display (LCD) or organic light-emitting diode (OLED). In some examples, the display 142 includes a projection display (e.g., used in smart glasses), where virtual images are projected onto a semi-transparent screen that is positioned in front of the user's eyes, which may use a waveguide 112.

The display system 140 includes a focal distance. In some examples, the focal distance is fixed. The focal distance is the distance at which virtual content 120 is formed in front of the eye. In some examples, the focal distance is a predetermined distance that is set by the display system 140. In some examples, the focal distance is fixed (e.g., not adapted or adjusted by the head-mounted display device 100). In some examples, a head-mounted display device 100 having a predetermined (or fixed) focal distance may be simpler to design and manufacture than a variable or adaptive focal length, which may lead to lower costs and a more reliable device.

The display system 124 includes an eye-side lens 114, a waveguide 112, and a world-side lens 116. A waveguide 112 is an optical component that guides light from the display 142 to the user's eye. The waveguide 112 may include a transparent material and/or a polymer material. The waveguide 112 is disposed between the eye-side lens 114 and the world-side lens 116. The eye-side lens 114 is positioned on one side of the waveguide 112 and the world-side lens 116 is positioned on the other side of the waveguide 112. The eye-side lens 114 is the lens that is closest to the user's eye. The eye-side lens 114 may include a deformable lens, which, when activated, deforms to a concave lens that is used to focus the light from the display onto the user's retina. The world-side lens 116 may be the lens that is furthest from the user's eye. The world-side lens 116 may include a deformable lens, when, when activated, deforms to a convex lens that is used to focus the light from the real world onto the user's retina.

In some examples, the eye-side lens 114 includes an adaptive prism member 146. In some examples, the adaptive prism member 146 is a prism film. In some examples, the adaptive prism member 146 may be coupled to the eye-side lens 114. In some examples, the adaptive prism member 146 includes a Fresnel prism film. A Fresnel prism film is a thin, flexible film that contains a series of concentric grooves or ridges. These grooves and ridges bend light in a specific direction, similar to a traditional prism. A Fresnel prism film may include a polymer material. In some examples, the adaptive prism member 146 on the eye-side lens 114 may apply a prism dioptre offset when the eye-side lens 114 is activated, which may assist with binocular fusion issues when the display 142 is activated. In some examples, a controller 108 may activate or deactivate the adaptive prism member 146. In some examples, the controller 108 may activate the adaptive prism member 146 when the display 142 is activated (e.g., turned on). In some examples, when the adaptive prism member 146 is activated, the adaptive prism member 146 may automatically align the display on one eye relative to the display in the other eye. In some examples, the world-side lens 116 includes the adaptive prism member 146. In some examples, the eye-side lens 114 includes an adaptive prism member 146, and the world-side lens 116 includes an adaptive prism member 146.

The eye-side lens 114 and the world-side lens 116 include adaptive optics. For example, each of the eye-side lens 114 and the world-side lens 116 includes a deformable member, which, when activated, deforms to provide a target optical power (e.g., measured in diopters). Activating the eye-side lens 114 includes applying a voltage to the eye-side lens 114. Activating the world-side lens 116 includes applying a voltage to the world-side lens 116. When activated, the eye-side lens 114 is configured to have a first optical power (e.g., measured in diopters). When activated, the world-side lens 116 is configured to have a second optical power (e.g., measured in diopters). In some examples, the first optical power and the second optical power have the same but opposite diopters values. In some examples, when the eye-side lens 114 and the world-side lens 116 are deactivated, their respective optical powers may be zero.

The head-mounted display device 100 includes a controller 108 configured to control activation or deactivation of the display 142, the eye-side lens 114, and the world-side lens 116. Activating a display 142 on a head-mounted display device 100 includes powering on the display 142 so that the display 142 can be used to display virtual content 120. The head-mounted display device 100 may include a control (e.g., a button) that can be selected (e.g., pressed) to activate the display 142. The head-mounted display device 100 may include a touch sensor on a portion (e.g., the frame) of the head-mounted display device 100 that can be tapped to activate the display 142. The head-mounted display device 100 may have a motion sensor that detects when the head-mounted display device 100 is being worn and automatically activates the display 142. Once the display 142 is activated, the display 142 may show a variety of information as the virtual content 120 such as the time, the weather, notifications from a phone, or/or directions from a navigation app. In some examples, the head-mounted display device 100 may provide an AR overlay as the virtual content 120.

The controller 108 may activate the eye-side lens 114 and the world-side lens 116. Activation of the eye-side lens 114 and the world-side lens 116 causes virtual content 120 to be displayed on a display 142 at a virtual depth 122*a* (e.g., a first virtual depth). In other words, when virtual content 120 is initiated to be displayed, the virtual content 120 is positioned at the virtual depth 122*a* when the eye-side lens 114 and the world-side lens 116 are activated. In some examples, the virtual depth 122*a* is relatively close to the user. In some examples, the virtual depth 122*a* is the focal distance of the display 142. In some examples, in response to the display 142 being activated, the controller 108 activates (e.g., automatically activates) the eye-side lens 114 and the world-side lens 116.

In some examples, the head-mounted display device 100 includes a depth control 136, which, when selected by the user, causes the controller 108 to activate (or deactivate) the eye-side lens 114 and the world-side lens 116. In some examples, selection of the depth control 136 causes the eye-side lens 114 and the world-side lens 116 to be activated. In some examples, selection of the depth control 136 causes the eye-side lens 114 and the world-side lens 116 to be deactivated. In some examples, when the display 142 is powered-on, the controller 108 automatically activates the eye-side lens 114 and the world-side lens 116. Then, the user may select the depth control 136 to deactivate the eye-side lens 114 and the world-side lens 116 (and then may select the depth control 136 to re-activate the eye-side lens 114 and the world-side lens 116) in order to switch the virtual depth 122 of the virtual content 120.

When the eye-side lens 114 and the world-side lens 116 are deactivated, the virtual content 120 is displayed at a virtual depth 122*b*. As shown in FIGS. 1B and 1C, the virtual depth 122*b* is greater than the virtual depth 122*a*. In some examples, the virtual depth 122*b* is further away from the user than the virtual depth 122*a*. In some examples, when the light exiting a projection device is collimated with focusing power on the eye-side lens 114, the user will perceive the image as coming from infinity (e.g., far away, the virtual depth 122*b*). When the eye-side lens' power of a certain optical power (e.g., −0.5D, which has a focal length of two meters) is activated, the light rays coming from the waveguide 112 are refracted as a specific angle and the user perceives the virtual image at a certain distance (e.g., two meters, the virtual depth 122*a*). When the eye-side lens' power is activated, the world-side lens' power (e.g., of +0.5D) is also activated to ensure that the real world remains in focus.

In some examples, when the display 142 is deactivated (e.g., powered-off), in response to detection of a selection by the user, the controller 108 may activate the world-side lens 116 (while the eye-side lens 114 is deactivated). In some examples, in response to a selection of a presbyope boost 138, the controller 108 may activate the world-side lens 116 while the display 142 is deactivated (e.g., powered off) to provide additional optical boost to reduce eyestrain and increase magnification power when performing up-close work. The presbyope boost 138 may be a user control on the head-mounted display device 100.

In some examples, the controller 108 may receive image data 106 from a camera device 104 of the head-mounted display device 100, identify a category of a scene from the image data 106, and activate or deactivate the eye-side lens 114 and the world-side lens 116 based on the category. The camera device 104 may capture image data 106 from the physical environment from the field of view of the camera device 104. In some examples, the controller 108 includes an image recognition algorithm configured to detect a category among a plurality of categories based on the image data 106 from the camera device 104. In some examples, the controller 108 includes a machine-learning (ML) model. The category may be an outside environment or an inside environment.

In some examples, when the controller 108 detects an outside environment based on the image data 106, the controller 108 may deactivate the eye-side lens 114 and the world-side lens 116 so that the virtual content 120 is positioned at the virtual depth 122*b* (e.g., the virtual content 120 is positioned further away from the user). In some examples, when the controller 108 detects an inside environment based on the image data 106, the controller 108 may activate the eye-side lens 114 and the world-side lens 116 so that the virtual content 120 is positioned at the virtual depth 122*a* (e.g., the virtual content 120 is positioned closer to the user).

The processor(s) 101 may be formed in a substrate configured to execute one or more machine executable instructions or pieces of software, firmware, or a combination thereof. The processor(s) 101 can be semiconductor-based—that is, the processors can include semiconductor material that can perform digital logic. The memory device(s) 103 may include a main memory that stores information in a format that can be read and/or executed by the processor(s) 101. The memory device(s) 103 includes a non-transitory computer-readable medium that includes executable instructions that cause at least one processor (e.g., the processors 101) to execute operations discussed herein.

Figure 2A:
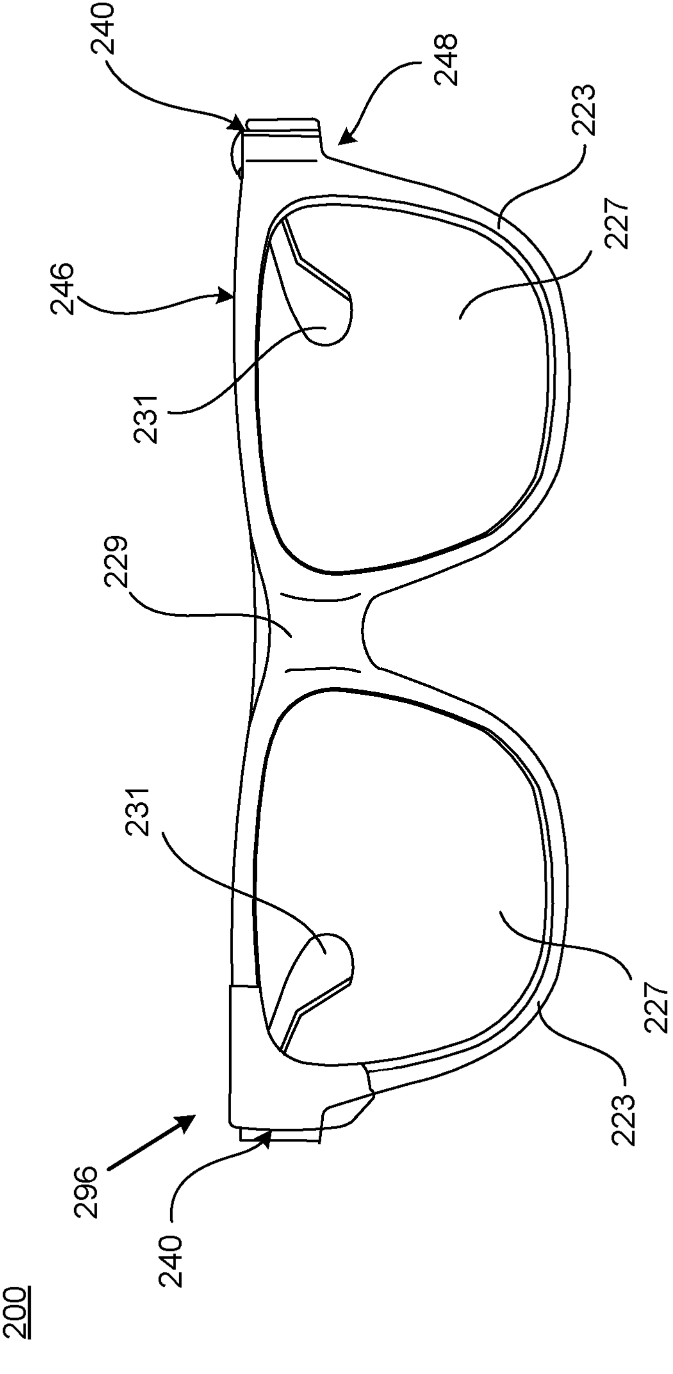
FIG. 2A illustrates an example of smartglasses according to an aspect.
Figure 2B:
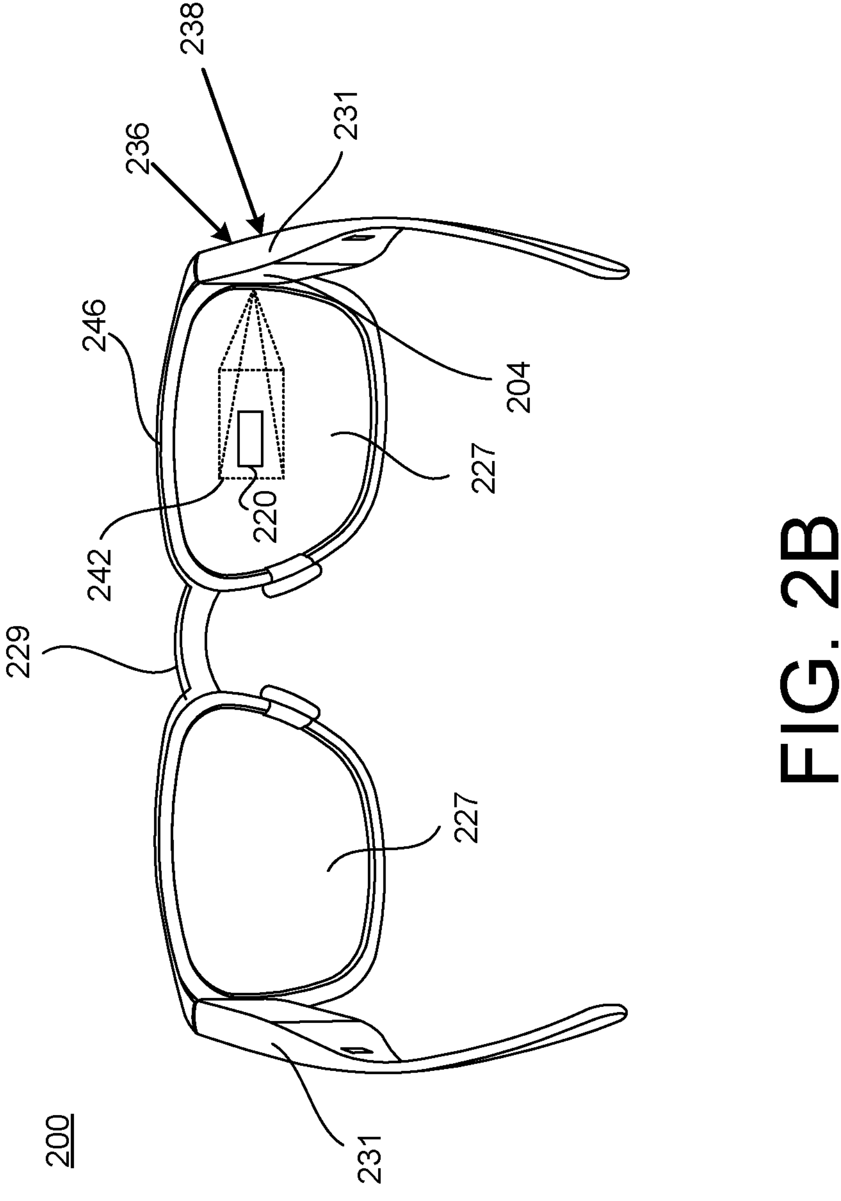
FIG. 2B illustrates an example of smartglasses according to another aspect.

FIGS. 2A and 2B illustrate an example of a head-mounted display device 200 according to an aspect. The head-mounted display device 200 may be an example of the head-mounted display device 100 of FIGS. 1A to 1C and may include any of the details discussed with reference to those figures. FIG. 2A is a front view of the head-mounted display device 200, and FIG. 2B is a rear view of the head-mounted display device 200.

The head-mounted display device 200 includes smart glasses 296 or augmented reality glasses, including display capability, computing/processing capability, and object tracking capability. The head-mounted display device 200 is configured to render a display 242 with virtual content 220. The head-mounted display device 200 includes a controller (e.g., the controller 108 of FIGS. 1A to 1C) configured to adjust a virtual depth of the virtual content 220, e.g., between a first virtual depth (e.g., relatively close to the user) and a second virtual depth (e.g., relatively far away from the user). In some examples, the head-mounted display device 200 includes a depth control 136 on a frame 210. The depth control 136 may be a user control that enables the user to switch between the virtual depths. In some examples, the head-mounted display device 200 includes a presbyope boost 138 on a frame 210. The presbyope boost 138 may be a user control that enables the user to activate a presbyope boost to add optical power.

The head-mounted display device 200 includes a frame 210. The frame 210 includes a front frame portion 246, and a pair of arm portions 231 rotatably coupled to the front frame portion 246 by respective hinge portions 248. The front frame portion 246 includes rim portions 223 surrounding respective optical portions in the form of lenses 227, with a bridge portion 229 connecting the rim portions 223. The arm portions 231 are coupled, for example, pivotably or rotatably coupled, to the front frame portion 246 at peripheral portions of the respective rim portions 223. A lens 227 may include the eye-side lens 114 of FIGS. 1A to 1C and the world-side lens 116 of FIGS. 1A to 1C.

In some examples, the head-mounted display device 200 includes a display device 204 (e.g., projector) configured to output virtual content 220, for example, on a display 242, so that the virtual content 220 is visible to the user. The display device 204 may be provided in one of the two arm portions 231. In some examples, a display device 204 may be provided in each of the two arm portions 231 to provide for binocular output of content. In some examples, the display device 204 may be a see through near eye display. In some examples, the display device 204 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 227, next to virtual content 220 (for example, digital images, user interface elements, virtual content, and the like) output by the display device 204. In some implementations, waveguide optics (e.g., the waveguide 112 of FIGS. 1A to 1C) may be used to depict content on the display device 204.

Figure 3:
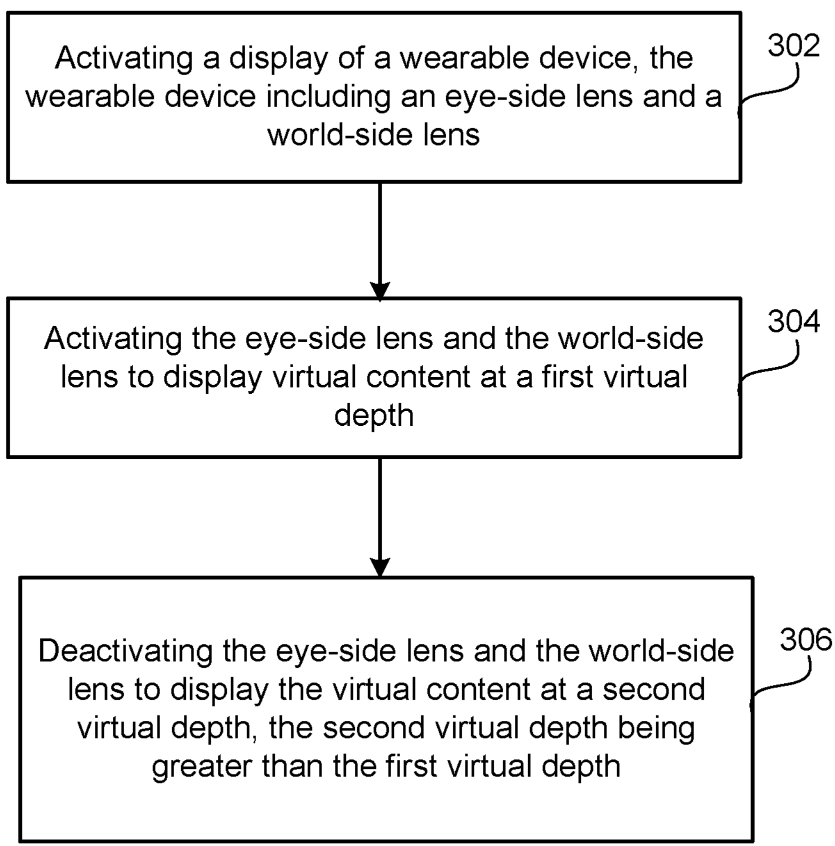
FIG. 3 illustrates a flowchart depicting example operations of a head-mounted display device according to an aspect.

FIG. 3 is a flowchart 300 depicting example operations for adjusting a virtual depth of virtual content on a head-mounted display device. The flowchart 300 may depict operations of a computer-implemented method. Although the flowchart 300 is explained with respect to the head-mounted display device 100 of FIGS. 1A through 1C, the flowchart 300 may be applicable to any of the implementations discussed herein. Although the flowchart 300 of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion.

Operation 302 includes activating a display 142 of a head-mounted display device 100, the head-mounted display device 100 including an eye-side lens 114 and a world-side lens 116. Operation 304 includes activating the eye-side lens 114 and the world-side lens 116 to display virtual content 120 at a first virtual depth (e.g., virtual depth 122*a*). Operation 306 includes deactivating the eye-side lens 114 and the world-side lens 116 to display the virtual content 120 at a second virtual depth (e.g., virtual depth 122*b*), the second virtual depth being greater than the first virtual depth.

Clause 1. A method comprising: activating a display of a head-mounted display device, the head-mounted display device including an eye-side lens and a world-side lens; activating the eye-side lens and the world-side lens to display virtual content at a first virtual depth;

and deactivating the eye-side lens and the world-side lens to display the virtual content at a second virtual depth, the second virtual depth being greater than the first virtual depth.

Clause 2. The method of clause 1, further comprising: deactivating the display; and activating the world-side lens.

Clause 3. The method of clause 1, further comprising: detecting a user selection to a control on the head-mounted display device; and in response to the user selection being detected, deactivating the eye-side lens and the world-side lens.

Clause 4. The method of clause 1, further comprising: receiving image data from a camera device; identifying a category of a scene from the image data; and activating or deactivating the eye-side lens and the world-side lens based on the category.

Clause 5. The method of clause 1, wherein activating the eye-side lens and the world-side lens including applying a voltage to the eye-side lens and the world-side lens.

Clause 6. The method of clause 1, wherein the eye-side lens and the world-side lens have opposite optical powers.

Clause 7. A head-mounted display device comprising: at least one processor; and a non-transitory computer-readable medium storing executable instructions that cause the at least one processor to execute: activate a display of a head-mounted display device, the head-mounted display device including an eye-side lens and a world-side lens; activate the eye-side lens and the world-side lens to display virtual content at a first virtual depth; and deactivate the eye-side lens and the world-side lens to display the virtual content at a second virtual depth, the second virtual depth being greater than the first virtual depth.

Clause 8. The head-mounted display device of clause 7, wherein the eye-side lens includes an adaptive prism member.

Clause 9. The head-mounted display device of clause 7, wherein the executable instructions include instructions that cause the at least one processor to: deactivate the display; and activate the world-side lens.

Clause 10. The head-mounted display device of clause 7, wherein the executable instructions include instructions that cause the at least one processor to: detect a user selection to a control on the head-mounted display device; and in response to the user selection being detected, deactivate the eye-side lens and the world-side lens.

Clause 11. The head-mounted display device of clause 7, wherein the executable instructions include instructions that cause the at least one processor to: receive image data from a camera device; identify a category of a scene from the image data; and activate or deactivate the eye-side lens and the world-side lens based on the category.

Clause 12. A non-transitory computer-readable medium storing executable instructions that when executed by at least one processor cause the at least one processor to execute operations, the operations comprising: activating a display of a head-mounted display device, the head-mounted display device including an eye-side lens and a world-side lens; activating the eye-side lens and the world-side lens to display virtual content at a first virtual depth; and deactivating the eye-side lens and the world-side lens to display the virtual content at a second virtual depth, the second virtual depth being greater than the first virtual depth.

Clause 13. The non-transitory computer-readable medium of clause 12, wherein the operations further comprise: deactivating the display; and activating the world-side lens.

Clause 14. The non-transitory computer-readable medium of clause 12, wherein the operations further comprise: detecting a user selection to a control on the head-mounted display device; and in response to the user selection being detected, deactivating the eye-side lens and the world-side lens.

Clause 15. The non-transitory computer-readable medium of clause 12, wherein the operations further comprise: receiving image data from a camera device; identifying a category of a scene from the image data; and activating or deactivating the eye-side lens and the world-side lens based on the category.

Clause 16. The non-transitory computer-readable medium of clause 12, wherein activating the eye-side lens and the world-side lens including applying a voltage to the eye-side lens and the world-side lens.

Clause 17. The non-transitory computer-readable medium of clause 12, wherein the eye-side lens and the world-side lens have opposite optical powers.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an OLED (Organic light emitting diode) or LCD (liquid crystal display) monitor) for displaying information to the user and a keyboard and a pointing device (e.g., a mouse or a trackball) by which the user can provide input to the computer. Alternatively, this can be implemented with a 3D user interaction system making use of trackers that are tracked in orientation and 3D position. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:

activating a display of a head-mounted display device, the head-mounted display device including an eye-side lens and a world-side lens;

activating the eye-side lens and the world-side lens to display virtual content at a first virtual depth; and deactivating the eye-side lens and the world-side lens to display the virtual content at a second virtual depth, the second virtual depth being greater than the first virtual depth, wherein the deactivation corresponds to a state in which no power is applied to the eye-side lens and the world-side lens.

2. The method of claim 1, further comprising:

deactivating the display; and activating the world-side lens.

3. The method of claim 1, further comprising:

detecting a user selection to a control on the head-mounted display device; and in response to the user selection being detected, deactivating the eye-side lens and the world-side lens.

4. The method of claim 1, further comprising:

receiving image data from a camera device;

identifying a category of a scene from the image data; and activating or deactivating the eye-side lens and the world-side lens based on the category.

5. The method of claim 1, wherein activating the eye-side lens and the world-side lens includes applying a voltage to the eye-side lens and the world-side lens.

6. The method of claim 1, wherein the eye-side lens and the world-side lens have opposite optical powers.

7. A head-mounted display device comprising: at least one processor; and a non-transitory computer-readable medium storing executable instructions that cause the at least one processor to execute: activate a display of a head-mounted display device, the head-mounted display device including an eye-side lens and a world-side lens; activate the eye-side lens and the world-side lens to display virtual content at a first virtual depth; and deactivate the eye-side lens and the world-side lens to display the virtual content at a second virtual depth, the second virtual depth being greater than the first virtual depth, wherein the deactivation corresponds to a state in which no power is applied to the eye-side lens and the world-side lens.

8. The head-mounted display device of claim 7, wherein the eye-side lens includes an adaptive prism member.

9. The head-mounted display device of claim 7, wherein the executable instructions include instructions that cause the at least one processor to:

deactivate the display; and activate the world-side lens.

10. The head-mounted display device of claim 7, wherein the executable instructions include instructions that cause the at least one processor to:

detect a user selection to a control on the head-mounted display device; and in response to the user selection being detected, deactivate the eye-side lens and the world-side lens.

11. The head-mounted display device of claim 7, wherein the executable instructions include instructions that cause the at least one processor to:

receive image data from a camera device;

identify a category of a scene from the image data; and activate or deactivate the eye-side lens and the world-side lens based on the category.

12. A non-transitory computer-readable medium storing executable instructions that when executed by at least one processor cause the at least one processor to execute operations, the operations comprising: activating a display of a head-mounted display device, the head-mounted display device including an eye-side lens and a world-side lens; activating the eye-side lens and the world-side lens to display virtual content at a first virtual depth; and deactivating the eye-side lens and the world-side lens to display the virtual content at a second virtual depth, the second virtual depth being greater than the first virtual depth, wherein the deactivation corresponds to a state in which no voltage is applied to the eye-side lens and the world-side lens.

13. The non-transitory computer-readable medium of claim 12, wherein the operations further comprise:

deactivating the display; and activating the world-side lens.

14. The non-transitory computer-readable medium of claim 12, wherein the operations further comprise:

detecting a user selection to a control on the head-mounted display device; and in response to the user selection being detected, deactivating the eye-side lens and the world-side lens.

15. The non-transitory computer-readable medium of claim 12, wherein the operations further comprise:

receiving image data from a camera device;

identifying a category of a scene from the image data; and activating or deactivating the eye-side lens and the world-side lens based on the category.

16. The non-transitory computer-readable medium of claim 12, wherein activating the eye-side lens and the world-side lens includes applying a voltage to the eye-side lens and the world-side lens.

17. The non-transitory computer-readable medium of claim 12, wherein the eye-side lens and the world-side lens have opposite optical powers.

* * * * *